United States Patent [19]

Köepper et al.

[11] 4,454,800
[45] Jun. 19, 1984

[54] ACTIVE MECHANICAL HYDRAULIC CONTROL APPARATUS

[75] Inventors: Rudolf Köepper, Vaihingen-Enz; Karl-Joachim Rowold, Friedrichsdorf, both of Fed. Rep. of Germany

[73] Assignee: Feinmechanische Werke Mainz GmbH, Mainz-Mombach, Fed. Rep. of Germany

[21] Appl. No.: 351,279

[22] Filed: Feb. 22, 1982

Related U.S. Application Data

[63] Continuation-in-part of Ser. No. 89,855, Oct. 31, 1979, abandoned.

[30] Foreign Application Priority Data

Nov. 8, 1978 [DE] Fed. Rep. of Germany ....... 2848339

[51] Int. Cl.³ ..................... F15B 15/22; F15B 13/04
[52] U.S. Cl. ........................... 91/51; 91/392; 92/131
[58] Field of Search ................. 91/51, 49, 388, 392

[56]  References Cited

U.S. PATENT DOCUMENTS

| | | | |
|---|---|---|---|
| 1,783,348 | 12/1930 | Taylor | 188/275 |
| 2,087,350 | 7/1937 | McCann | 188/275 |
| 2,813,519 | 11/1957 | Persson et al. | 91/51 |
| 2,841,168 | 7/1958 | Levetus et al. | 91/51 |
| 3,083,695 | 4/1963 | Stiglie | 91/51 |
| 4,137,825 | 2/1979 | Leonard | 91/388 |

FOREIGN PATENT DOCUMENTS

| | | | |
|---|---|---|---|
| 931747 | 11/1955 | Fed. Rep. of Germany | 91/51 |
| 1,356,232 | 2/1964 | France | 91/51 |

*Primary Examiner*—Paul E. Maslousky
*Attorney, Agent, or Firm*—W. G. Fasse; D. H. Kane, Jr.

[57]  ABSTRACT

An active, mechanical hydraulic control device for vehicles including watercraft and aircraft, comprises an acceleration pick-up having a relatively small mass. Movements of the mass are sensed by a nozzle and deflection plate system which controls as a preamplifier the displacement of a power drive member provided with one or more control apertures, the flow cross-sectional areas of which depend on the instantaneous position of a piston to which the power drive member is connected. The movements of the mass vary the gap width between the nozzle or nozzles and the deflection plate forming part of the movable mass. The change in the gap width controls the adjustment or displacement of the power drive member through a follower amplifier formed by the piston. The central or balanced position of the piston is assured by the control apertures forming respective piston position responsive valves.

10 Claims, 3 Drawing Figures

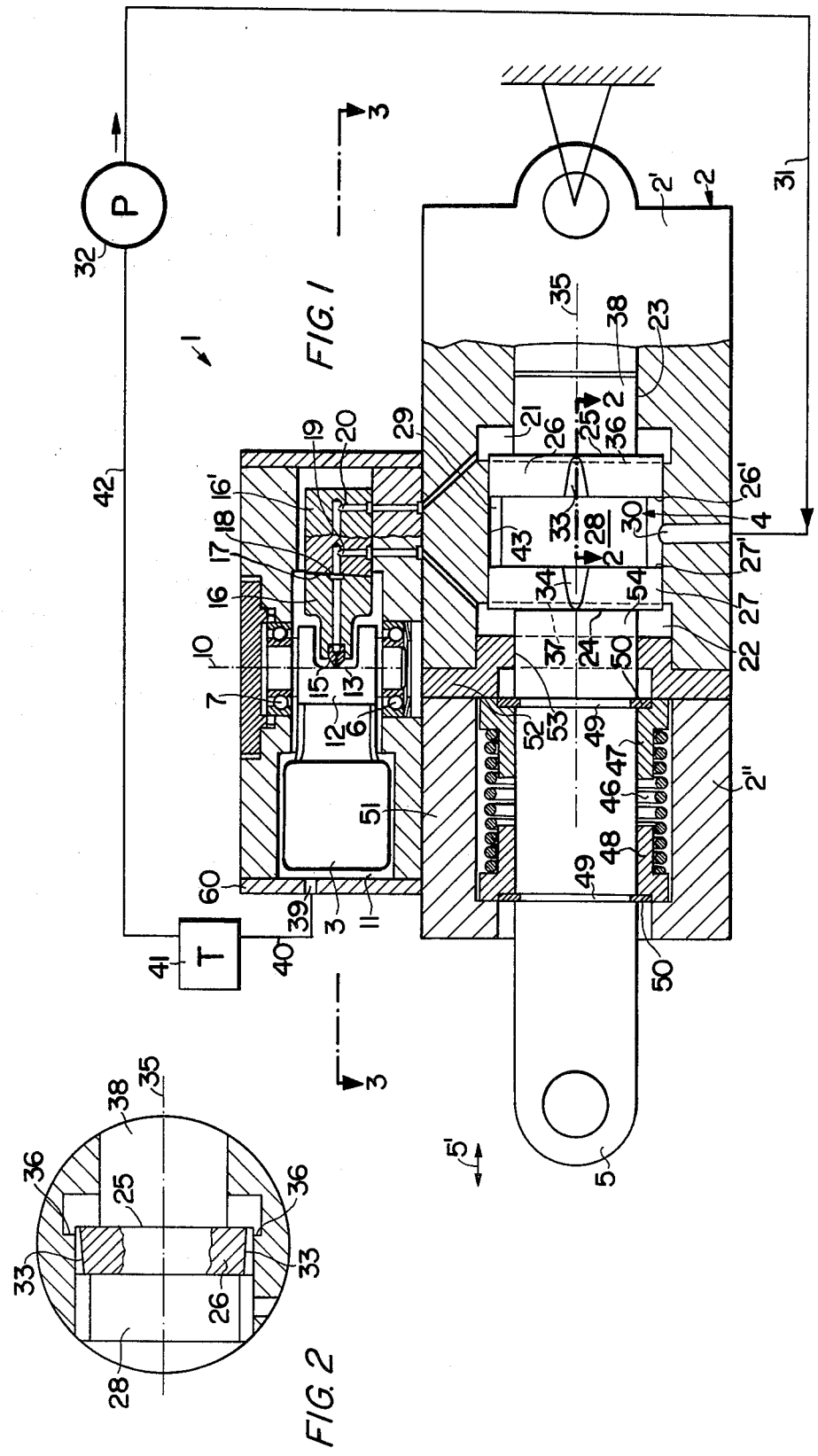

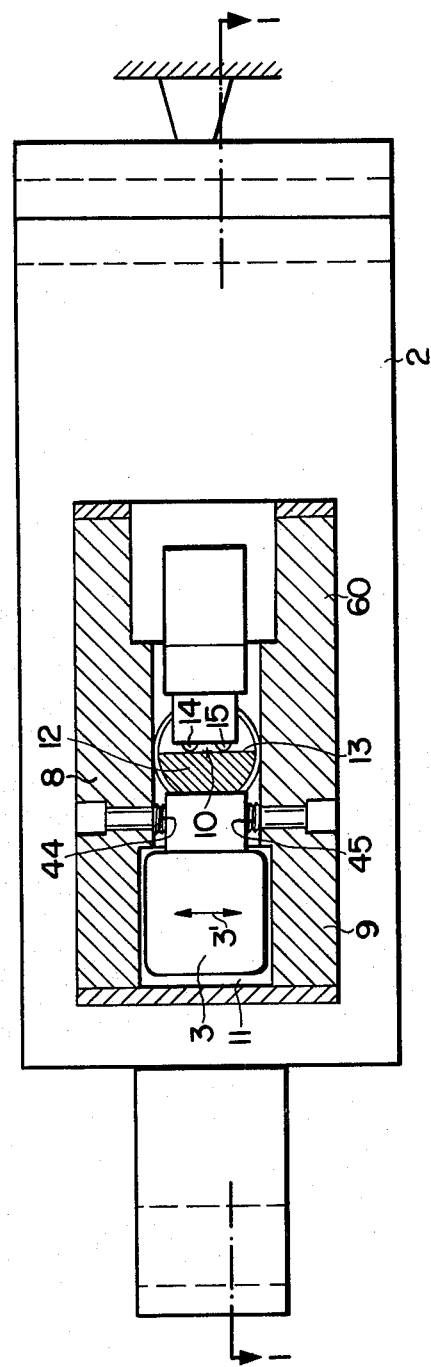

ACTIVE MECHANICAL HYDRAULIC CONTROL APPARATUS

CROSS-REFERENCE TO RELATED APPLICATIONS

The present application is a continuation-in-part application of my copending parent application Ser. No. 089,855, filed on Oct. 31, 1979, now abandoned.

BACKGROUND OF THE INVENTION

The present invention relates to an active mechanical hydraulic control apparatus. More specifically, the invention relates to a hydraulic actuator for operating, for example, an elevator or rudder flap of an aircraft or other craft in response to an attitude change of the craft. Such positional or attitude changes may be caused by wind or wave forces and cannot be corrected positively by conventional passive dampers.

U.S. Pat. No. 2,087,350 (McCann) issued July 20, 1937 discloses a passive damper which converts shock energy, for example when a vehicle wheel travels through a hole in the road, into hydraulic pressure which in turn is dissipated through throttling valves. Two pistons are moved in response to vehicle body movements caused by shocks effective in one or the other direction. Both pistons are moved by the same lever arm which senses excursions of the vehicle wheel. The pressure building up in one or the other chamber due to the respective piston movement is dissipated through two series connected valves in a respective return flow passage for the hydraulic medium. One valve in each return flow passage is a spring biased pressure responsive valve. The other valve connected in series with the pressure responsive valve in each return flow passage is controlled by the movement of an inertia mass. The arrangement is such that the inertia movement responsive valve is normally open so that for damping of average shocks the pressure responsive valve is effective. The inertia responsive valve becomes only effective in response to heavy shocks. To provide for a smooth vehicle ride the structure of U.S. Pat. No. 2,087,350 requires a dashpot device for the inertia responsive control of the valves. Such a structure is an effective passive damper or shock absorber but it is not suitable for actively or positively actuating, for example, an elevator flap of an aircraft in response to changes in the attitude of the aircraft as a result of wind gusts.

U.S. Pat. No. 1,783,348 (Taylor) issued Dec. 2, 1930 discloses a shimmying damper which is intended to dampen vehicle wheel vibrations without impeding the steering action. Taylor discloses a piston cylinder arrangement in which the piston is normally biased into a central or neutral position by two springs. Such a structure is also not suitable for an effective correction of the attitude of a craft by positively adjusting the position of a flap or the like in response to the excursion of the craft from a predetermined attitude.

Prior art active control devices in the steering system of a craft generally comprises a combination of mechanical acceleration sensors, a valve and a piston operating as an actuator or adjustment member.

The valve controls, in response to sensed accelerations, the oil flow in a piston cylinder control unit or arrangement in such a manner that the vibration amplitudes of a constant reference mass connected to the piston of the arrangement, are substantially reduced. If the mass to be damped is not constant, but rather variable, it is necessary to provide an additional power or follower amplifier also comprising a control valve and a piston cylinder arrangement which is mechanically connected between the piston of the active control unit and the constant reference mass. The accelerations effective on the reference mass cause pressure to be applied to the piston of the control unit in such a way, that, ideally, the effective pressures may be reduced to zero since they balance each other. Thus, the constant reference mass is movable relative to the vehicle and it may be substantially stationary relative to a fictitious reference point on the earth. Due to the mechanical connection with the valve slide of the follower amplifier and due to the hydraulic coupling between the valve slide and the cylinder a relative movement of practically the same amplitude occurs between the mass to be damped and the vehicle.

Similarly constructed active control devices are known as electro-mechanical or electro-hydraulic systems especially used in aircraft engineering. Such systems are used in active control systems of limited authority for compensating aircraft movements resulting from disturbances such as wind gusts causing movements about the roll axis, the pitch axis, and the yaw axis. These prior art control systems comprise electro-mechanical sensors such as gyros, acceleration pick-ups, and include electronic signal processing means as well as electro-hydraulic actuator means with electrical resetting means.

The operability of these systems must be assured at all times because errors and failures cannot be compensated by simply shutting off the defective part. This assured operability must especially be satisfied by the mechanical, electro-mechanical, and electro-hydraulic components of the active regulating or control systems.

In these active prior art systems the operability is frequently impaired at the interface of the signal transmission, that is, between the mechanical-electrical sensors, the electrical signal processing, the electro-hydraulic adjustment drives and the electrical resetting means. A further disadvantage of prior art systems is seen in that they are too heavy and require too much space.

OBJECTS OF THE INVENTION

In view of the above it is the aim of the invention to achieve the following objects singly or in combination:

to provide an active, that is a positively driven, strictly mechanical hydraulic control or regulating system which has an improved operability and an increased reliability while also being lightweight and compact;

to control the position of an attitude determining flap, such as a wing or tail flap of an aircraft in such a manner that the control pressure is determined by the instantaneous position of a piston to which a flap drive member is connected; and to control the position of an attitude determining flap relative to a predetermined flap position in such a way that any excursion of the flap away from the predetermined position is positively counteracted by a pressure application in the opposite direction to return the flap into the predetermined position, whereby the applied pressure for the correction is determined by the extent of an attitude deviation from a predetermined attitude.

SUMMARY OF THE INVENTION

The active mechanical hydraulic control apparatus according to the invention, comprises a relatively small mass for sensing excursions or accelerations of a craft out of a predetermined attitude. The resulting signal is amplified in an anticipatory or preamplification control stage. A power drive member, which is positively driven by a pressure source such as a hydraulic pump, a follower amplifier and center position control means for the power drive member are integrated into a structural unit. The center position control means comprise control apertures the cross-sectional size of which depends on the instantaneous position of the power drive member. This cross-sectional size in turn is equivalent to the signal sensed by the inertia mass, whereby the control pressure supplied by the hydraulic pump is determined by the sensed signal in a closed loop feedback control fashion.

More specifically, the invention provides a mechanical hydraulic control apparatus, comprising housing means 2, a bore in said housing means, a drive member 4, 5 having a piston at one end and a free end at the other end for connection to a driven member, said piston being axially movable in said bore, said bore having first and second chambers, said piston having first and second piston portions facing the respective first and second chambers to form follower amplifier means, said piston further having a reduced diameter portion 28 forming a third chamber intermediate said first and second piston portions, pump means 32 operatively connected with its pressure output to said third chamber, piston position responsive flow valve means as self adjusting or controlling throttle valve 33, 34 in said first and second piston portions for connecting said third chamber with said first and second chambers through respective flow passage cross-sectional areas which vary responsive to the back and forth movement of the piston means in said bore to thereby form piston center position control means, acceleration sensing mass means 3 journalled for movement in said housing, mass means position responsive further valve means as baffle plate 13 and nozzles 14, 15 forming a preamplifier, duct means in said housing operatively connecting said further valve means 13, nozzle 14, 15 to said first and second chambers respectively and return flow conduit means operatively connecting said further valve means to a suction inlet of said pump means, whereby said drive member, said follower amplifier means and said piston center position control means form an integral unit, and whereby said drive member is adjusted in response to the movement of said acceleration sensing mass means.

The present closed loop active control apparatus with its center position control means, its power drive member and with its follower amplifier including the closed loop or internal feedback control provides an integral, compact lightweight structure with a high pressure efficiency and with a high throughflow efficiency.

The mass acceleration sensor or pick-up comprises a relatively small mass of, for example 50 grams, which mass is supported in bearings for pivoting or journalling about a predetermined axis. The mechanical excursions of the sensor mass are converted and thereby amplified in the form of pressure signals by the anticipatory or preamplification control stage. This preamplification control stage comprises nozzles and a bouncing or deflecting plate forming a system of valves. The flow volume through these valves is determined by the instantaneous position or spacing of the bouncing plate from the nozzles. If the spacing between one nozzle and the bouncing plate is increased, the spacing between the other nozzle and the bouncing plate is decreased and vice versa, whereby the volume of flow through the nozzles is controlled. The so-called bouncing plate is machined directly into the rotational shaft of the acceleration sensor mass. The plane of the bouncing plate extends perpendicularly to the rotational plane of the acceleration sensor mass. At least two nozzles are provided which extend with their longitudinal flow axis perpendicularly to the plane of the bouncing plate. The so constructed preamplification stage receives the hydraulic fluid from the pump through the displacement chambers of the center position control means. Two springs tend to hold the acceleration sensing mass with its shaft and integral bouncing plate in a neutral, center position. Accelerations of the mass in one or the opposite direction cause a variation of the above mentioned spacings between the bouncing plate and the nozzles.

A nozzle adapter is supported on a slanted surface in the housing of the apparatus for manually displacing and adjusting the nozzles into an optimal position relative to the bouncing plate. Thus, the spacing between the nozzles and the bouncing plate may be adjusted. Further, the position of the nozzles relative to the journal axis of the acceleration sensor may also be adjusted by moving the nozzle adaptor along said slanted surface fixed in the housing. The extent of the adjustment is determined by the support surface of a sealing located between the nozzle adapter and the supply duct in the stationary slanted surface.

BRIEF FIGURE DESCRIPTION

In order that the invention may be clearly understood, it will now be described, by way of example, with reference to the accompanying drawings, wherein:

FIG. 1 is a sectional view through the mechanical, hydraulic control apparatus according to the invention along section line I—I in FIG. 3 and also showing the hydraulic power supply circuit;

FIG. 2 is a sectional detail view along line II—II in FIG. 1 and showing the position responsive cross-sectional flow area of the center position control means; and FIG. 3 is a sectional view along section line III—III in FIG. 1 and showing the details of the acceleration sensing mass and of the nozzle bouncing plate system of the preamplification stage.

DETAILED DESCRIPTION OF PREFERRED EXAMPLE EMBODIMENTS AND OF THE BEST MODE OF THE INVENTION

As best seen in FIG. 1, the present control apparatus comprises a main housing 2 including an upper housing member 2' and a lower housing member 2". A secondary housing 60 is secured to the main housing in a conventional manner. The main housing 2 comprises a longitudinal axial bore 23 having a central axis 35 and different bore diameters along its axial length as will be described in more detail below. The bore of the main housing 2 receives a piston 4 having an outer free end 5 which reaches out of the lower housing member 2" and which is connected, for example, to a flap for positively controlling the position of the flap in response to acceleration signals sensed by a mass 3 operatively journalled in the housing 60. The flap itself is not shown. The outer free end 5 of the piston 4 constitutes a piston rod.

The acceleration sensing mass 3 hereafter referred to as sensor or pick-up 3 comprises a relatively small mass of, for example 50 grams. This mass is journalled outside its center of gravity by means of two bearings 6 and 7 which receive respective journal studs of the pick-up 3 to form a journal axis 10. Thus, the pick-up 3 is permitted to perform pendulous movements about the journal axis 10 in a chamber 11 formed in the housing 60 as best seen in FIG. 3. The pendulous movements of the pick-up 3 are indicated by the double arrow 3' in FIG. 3. Since the housing 60 is rigidly secured to the housing 2, the pick-up 3 will make these movements in response to forces effective on the housing 2. The movements of the pick-up 3 are limited by wall portions 8 and 9 of the housing 60, also as best seen in FIG. 3.

The pick-up 3 comprises a shaft 12 the axially outer ends form the above mentioned studs which are received in the bearings 6 and 7. A bouncing or deflection plate 13 is directly machined into the shaft 12 in such position that this bouncing or deflection plate or surface 13 coincides with the journal axis 10 of the pick-up 3. The reflection or bouncing surface or plate 13 faces toward openings of nozzles 14 and 15 operatively supported in the housing 60 to thereby form mass position responsive valve means which form a preamplifier as will be described in more detail below. A small spacing is provided between the openings of the nozzles 14 and 15 and the deflection surface 13 when the pick-up 3 is in a central, neutral position as shown in FIG. 3. The nozzles 14 and 15 are carried by a nozzle adapter 16 which is manually adjustable in its position relative to the deflection or bouncing surface 13. The adjustment means for the nozzle support 16 are not shown but may comprise, for example a screw threaded through the wall of the housing 60 for sliding the nozzle support 16 along a slanted surface 17. The inner end of such an adjustment screw would be rotatably secured to the nozzle support 16. A sealing 18 is interposed in the slanted surface 17 between a stationary nozzle support 16' and the movable portion 16 of the nozzle support. The sealing 18 prevents any escape of hydraulic fluid which passes through the duct means 19 and 20 extending through the stationary nozzle support portion 16' and through the movable nozzle support portion 16. The surface area of the sealing means 18 and the diameter of the duct means 19 and 20 are large enough to permit the just described adjustment. The sealing means 18 make sure that hydraulic liquid is not passing out along the slanted surface 17 even as a result of an adjustment movement.

The duct means 19 and 20 separately connect the respective nozzles 14 and 15 to first and second chambers 21, 22 in the bore 23 of the housing 2. Between the chambers 21 and 22 the bore 23 has a reduced diameter section 43 compared to the chambers 21 and 22 having a larger diameter than the reduced diameter section 43. The section 43 has an axial length slightly smaller than the axial length of the piston 4 between its facing end surfaces 24 and 25. The piston 4 has first and second piston portions 26, 27 which are axially spaced from each other to form a reduced diameter piston portion 28 which in turn forms a third chamber 29 in the reduced diameter section 43 of the bore 23. The piston end surfaces 24 and 25 face in opposite axial directions and are formed as ring surfaces due to the piston rod 5 extending downwardly with a smaller diameter than the surface 24 and due to the piston guide end 38 also having a smaller diameter than the ring surface 25. The guide end 38 is received in the upper end of the bore 23. Further ring surfaces 26' and 27' face into the chamber 29. Thus, the first piston portion 26 is formed between the ring surfaces 26' and 25. The second piston portion 27 is formed between the ring surfaces 27' and 24. The surface areas 26' and 27' are somewhat smaller than the surface areas 25 and 24. The relationship of these ring surface areas depends on the diameter of the piston portions 28 and 38 and on the diameter of the piston portion 54 connecting the piston 4 to the piston rod 5. The ring gap or third chamber 29 is connected to a source of pressure such as a hydraulic pump 32 by means of a pressure conduit 31.

The third chamber or ring gap 29 is connected to the chambers 21 and 22 through valves, as self adjusting throttles the cross-sectional flow area of which depends on the instantaneous axial position of the piston portions 26 and 27 relative to the reduced diameter bore portion 43. These piston positions responsive valves comprise flattened, slanted surface portions 33, 34 in the cylindrical surfaces of the piston portions 26 and 27. These throttle surfaces 33 and 34 have a circumferential width which diminishes axially toward the respective piston end, whereby each flattened, slanted surface has a wide end and a narrow end. The wide ends face each other as best seen in FIG. 1. The slanting of the surfaces 33 and thus also of the surfaces 34 is shown in FIG. 2. These valve surfaces 33 and 34 are distributed about the circumference of the piston portions 26, 27, preferably in a symmetric distribution and located opposite each other. Thus, hydraulic fluid supplied by the pump 32 into the third chamber 29 may flow through these control valves formed by the surfaces 33, 34 from the chamber 29 into the chambers 21 and 22. The hydraulic fluid flow continues from the chambers 21 and 22 through the ducts 19 and 20 to the nozzles 14 and 15. There is a fluid connection from the outlets of the nozzles 14 and 15 around the pick-up 3 into the chamber 11 which in turn is connected through a port 39 to a hydraulic fluid tank 41 by a conduit 40. The tank 41 in turn is connected through a conduit 42 to the suction port of the pump 32. Due to the slanted position of the control valve surfaces 33 and 34 the flow cross-sectional area of these valves varies depending on the axial position of the piston 4 relative to the respective upper and lower ends 36, 37 of the reduced diameter portion 43 of the bore 23. In the shown example embodiment the surfaces 33 and 34 are slanted relative to the longitudinal axis 35. The direction of slant is such that the cross-sectional flow area increases for one valve when the piston moves upward, while the other cross-sectional flow area simultaneously diminishes. The reverse is true when the piston moves downwardly. Since the diameters of the chambers 21 and 22 are larger than the diameters of the piston portions 26 and 27, the hydraulic fluid may flow past the control edges 36 and 37 defining the upper and lower ends of the reduced diameter portion 43 of the bore. The just described features of the piston and bore constitute an integral drive member, a follower amplifier comprising the piston surfaces 24 and 25 as well as the center position control means comprising the slanted valve surfaces 33 and 34.

In the light of the foregoing description, any axial movement of the piston 4 is guided by the piston portions 38 and 54 and results simultaneously in the power extension of the piston rod 5.

The just described apparatus operates as follows. As long as the pick-up 3 is in a neutral position the hydraulic fluid under pressure from the pump 32 flows into the third chamber or ring gap 29 and through the piston position responsive valves formed by the valve surfaces 33, 34 into the chambers 21 and 22 in equal proportions because the piston is in the shown neutral position. The hydraulic fluid travels further through the ducts 19 and 20 into the nozzles 14 and 15. The same volume will flow through both nozzles 14 and 15 as long as the pick-up 3 remains in the neutral position. Thus, the equal volumes coming out of the nozzles 14 and 15 are united in the chamber 11 and returned to the tank 41 and from there to the pump 32.

As soon as the vehicle in which the present control apparatus is installed is subject to any disturbance or vibrations, the mass 3 is caused to move in one or the other direction as indicated by the arrow 3' in FIG. 3. This movement of the pick-up 3 is a pendulous type of movement about the journal axis 10. As a result the spacings between the bouncing or deflecting surface 13 and the nozzles 14 and 15 is changed because the bouncing or deflection surface 13 comes closer to one of the nozzles and is spaced farther from the other nozzle, depending on the direction of movement and vice versa. For example, if the pick-up 3 swings to the right in FIG. 3, the surface 13 comes closer to the nozzle 15 and is farther spaced from the nozzle 14. Thus, more hydraulic liquid volume can exit from the nozzle 14 while a smaller hydraulic liquid volume may exit from the nozzle 15 because the bouncing surface 13 restricts the fluid flow through the nozzle 15 in this example. Accordingly, the pressure in the duct 19 connected to the nozzles 15 increases while the pressure in the duct 20 connected to the nozzle 14 decreases. Corresponding pressure changes occur in the chambers 21 and 22, that is, the pressure in the chamber 22 rises while that in the chamber 21 decreases. As a rsult, the piston 4 moves upwardly from the chamber 22 toward the chamber 21 into a position proportional to the mass 3. The just described differing flow conditions at the nozzles 14 and 15 prevail as long as the pick-up 3 is subject to the mentiond acceleration in one or the other direction. Accordingly, the pressure differences also prevail in the chambers 21 and 22 until a position proportional to the mass deflection is reached and the pressure difference becomes zero.

When the pick-up 3 swings in the opposite direction the pressure conditions in the chambers 21 and 22 are reversed and the piston with its piston rod 5 moves downwardly as shown in FIG. 1.

It is a position/position control. The deflection of the mass or pick-up 3 effects a difference pressure in the chamber 21 and 22 through the different distances of the nozzles 14 and 15 from the surface 13 until the hydraulic liquid volumes at the valve surfaces 33 and 34 (are equal adapted) to the hydraulic liquid volumes at the nozzles 14 and 15.

The adaptation is finished when the piston 4 takes a position with which the hydraulic liquid volumes at the surface 34 and the nozzle 15 (with deflection of the piston 4 into the chamber 21 and a smaller hydraulic liquid volume) produce the same pressure in the chamber 22 as the greater hydraulic liquid volume at the valve surface 33 and the nozzle 14. The control valve surfaces 33 and 34 are so positioned on the piston portions 26 and 27 that a certain flow of hydraulic liquid from the third ring chamber 29 into the chambers 21 and 22 is possible in any position of the piston 4. As shown in FIG. 2 the valve surfaces 33 and 34 provide a constantly free flow cross-sectional area, however, the size of the flow cross-sectional area varies, depending on the piston position due to the slant of these surfaces. As a result, the valve formed by the surface 33 provides a smaller flow resistance when the piston 4 reaches with its piston portion 26 into the chamber 21 as compared to the situation when the piston ring surface 25 is directly at the level of the control surface 36, in other words, as compared to the situation when the piston portions 26 and 27 are in the shown centered positions in the bore portion 43. Accordingly, the valves formed by the surfaces 33 and 34 facilitate the hydraulic fluid flow from the gap chamber 29 into the chamber 21 or 22 depending on the instantaneous piston position and vice versa. This fluid flow control through the valves formed by the surfaces 33, 34 in combination with the flow control by the nozzles 14 and 15 in response to the instantaneous position of the surface 13 results at all times in a rapid, proportional control of the piston positions in response to the position of the pick-up 3. In the control the nozzles 14 and 15 with the deflection surface 13 form a preamplification stage which converts the mechanical movement of the pick-up 3 into proportionale hydraulic pressure signals which are amplified in the chambers 21, 22 effecting a proportional position of the mass 3. In this manner a closed loop type of feedback control is accomplished with a simultaneous preamplification and follower amplification as described.

As soon as no acceleration is effective on the pick-up 3, the springs 44 and 45 return the pick-up 3 into its center or zero or neutral position, whereby the spacing between the nozzles 14 and 15 on the one hand and the deflection surface 13 becomes equal again. Accordingly, the same pressure conditions are established in both chambers 21 and 22. Due to the oppositely or differently directed flow cross-sectional areas of the valves formed by the slanted surfaces 33, 34 it is possible to rapidly establish equal pressures in the chambers 21 and 22. This is so because the flow cross-sectional area toward the chamber with the lower pressure is larger than the flow cross-sectional area of the respective other valve to the chamber with the high pressure. Thus, the piston 4 returns relatively rapidly into the zero position with the disturbing acceleration ceases. This centering of the piston 4 in the absence of a disturbing force is not dependent on the spring 46. In fact, the present apparatus is fully operable without the spring 46. However, the spring 46 is provided for holding the piston 4 in a centered position with a predetermined spring force in case the pump 32 should fail.

The spring 46 is a compression coill spring and rests on two bushings 47, 48 which are axially movable along the piston rod 5 to the extent permitted by the holding rings 50 which sit in grooves 49 of the piston rod 5. In the shown centered or neutral position the bushing 48 rests against the end 51 of the housing member 2'' and the bushing 47 rests against a housing member 52. The housing member 52 closes the chamber 22 in the axial direction and provides a sealing bore 53 through which the piston portion 54 extends in a sealed manner.

Advantages of the invention are seen in that the deflection surface 13 with the nozzles 14 and 15 constitute a preamplifier which converts the signal represented by the movement of the pick-up 3 into a hydraulic signal which is simultaneously amplified and supplied to a follower amplifier formed by the piston 4. Another advantage is seen in that the follower amplifier with its piston portions 26 and 27 and the piston position responsive valves formed by the slanted valve surfaces 33 and 34 form an integral unit together with the drive member or piston rod 5. This unit is capable of rapidly following any movements of the pick-up 3 and also capable of rapidly returning into the zero or neutral position when the pick-up 3 assumes such a neutral position. Due to the fact that the piston portions 26 and 27 with the valve surfaces 33 and 34 are arranged symmetrically, these features also assure the above described function of a center position control means which is also an integral part of the just described structure.

Although the invention has been described with reference to specific example embodiments it will be appreciated that it is intended to cover all modifications and equivalents within the scope of the appended claims.

What is claimed is:

1. An active mechanical, hydraulic control apparatus, comprising housing means (2), a bore in said housing means, a drive member (4, 5) having a piston at one end and a piston rod at the other end for connection to a driven member, said piston being axially movable in said bore, said bore having first and second chambers, said piston having first and second piston portions facing the respective first and second chambers to form follower amplifier means, said piston further having a reduced diameter portion (28) forming a third chamber intermediate said first and second piston portions, pump means (32) operatively connected with its pressure output to said third chamber, piston position responsive flow valve means (33, 34) in said first and second piston portions for connecting said third chamber with said first and second chambers with respective flow passage cross-sectional areas which vary responsive to the back and forth movement of the piston means in said bore to thereby form piston center position control means, acceleration sensing mass means (3) journalled for movement in said housing, mass means position responsive further valve means (13, 14, 15) forming a preamplifier, duct means in said housing operatively connecting said further valve means (13, 14, 15) to said first and second chambers respectively and return flow conduit means operatively connecting said further valve means to a suction inlet of said pump means, whereby said drive member, said follower amplifier means and said piston center position control means form an integral unit, and whereby said drive member is adjusted in response to the movement of said acceleration sensing mass means.

2. The apparatus of claim 1, further comprising compression spring means (46) operatively located in said bore and connected to said drive member for opposing an outward movement of the drive member, said spring means being effective when the pump fails.

3. The apparatus of claim 1, wherein said duct means (19, 20) in said housing means supply the further valve means (13, 14, 15) with hydraulic liquid from said first and second chambers.

4. The apparatus of claim 1 or 2, wherein said further valve means (13, 14, 15) which are responsive to the position of said acceleration sensing mass means (3), comprise a bouncing surface (13) forming an integral part of said acceleration sensing mass means, and at least two nozzles (14, 15) arranged in said housing to face with respective nozzle openings said bouncing surface for varying the spacing between said nozzle openings and said bouncing surface when said acceleration sensing mass means moves.

5. The apparatus of claim 4, wherein said mass means comprises a journal axis (10) which extends in said bouncing surface (13), said bouncing surface extending perpendicularly to a plane in which said acceleration sensing mass means moves.

6. The apparatus of claim 5, wherein said acceleration sensing mass means comprise journal studs, said apparatus further comprising bearing means (6, 7) for operatively holding said journal studs in said housing means, and spring means (44, 45) held in said housing means for normally holding said acceleration sensing mass means in a centered position in which equal flow volumes may flow through said nozzles due to equal spacings between said nozzles and said bouncing surface (13), and whereby excursions of said acceleration sensing mass means from said centered position vary said spacings between said nozzles and said bouncing surface.

7. The apparatus of claim 5, further comprising a stationary nozzle support (16') for said nozzles (14, 15) in said housing means, said stationary nozzle support (16') comprising a stationary slanted surface (17) for adjustably positioning said nozzles (14, 15) relative to said bouncing surface (13) whereby the spacing between the nozzles (14, 15) and the bouncing surface (13) and the position of the nozzles (14, 15) relative to the journal axis (10) of the acceleration sensing mass means (3) is manually adjustable by sliding said nozzles (14, 15) along said slanted surface.

8. The apparatus of claim 7, wherein said duct means (19, 20) extend through said stationary nozzle support.

9. The apparatus of claim 1, wherein said piston position flow valve means (33, 34) comprise flattened, slanted surface portions on a peripheral surface of said first and second piston portions, said flattened slanted surface portions having a circumferential width which diminishes axially toward the respective piston end whereby each flattened, slanted surface portion has a wide end and a narrow end, said wide ends facing each other.

10. The apparatus of claim 9, wherein said bore comprises a section (43) of reduced diameter as compared to the diameter of said first and second chambers (21, 22), said reduced diameter bore section (43) receiving said piston and having an axial length slightly less than the axial length of said piston with its first and second piston portions (26, 27), whereby said flattened, slanted surfaces (33, 34) cooperate with said reduced diameter bore section (43) at the respective ends thereof in forming said piston position responsive flow valve means.

* * * * *